US012673883B2

(12) United States Patent     (10) Patent No.:   US 12,673,883 B2

D'Antonio et al.     (45) Date of Patent:     Jul. 7, 2026

(54) METHOD OF DOSING BIOCIDE INTO A FLUID SYSTEM

(71) Applicant: Grundfos Holding A/S, Bjerringbro (DK)

(72) Inventors: Sébastien D'Antonio, Bjerringbro (DK); Victor Augusto Yangali Quintanilla, Bjerringbro (DK); Joachim Bach Kaas, Bjerringbro (DK); Kristian Lydersen Rindom, Bjerringbro (DK)

(73) Assignee: Grundfos Holding A/S, Bjerringbro (DK)

( * ) Notice: Subject to any disclaimer, the term of this patent is extended or adjusted under 35 U.S.C. 154(b) by 76 days.

(21) Appl. No.: 17/552,442

(22) Filed: Dec. 16, 2021

(65) Prior Publication Data

US 2022/0194826 A1    Jun. 23, 2022

(30) Foreign Application Priority Data

Dec. 18, 2020    (EP) .................................... 20215430

(51) Int. Cl.
    *C02F 1/50*      (2023.01)

(52) U.S. Cl.
    CPC .......... *C02F 1/50* (2013.01); *C02F 2209/001* (2013.01); *C02F 2209/003* (2013.01); *C02F 2209/36* (2013.01); *C02F 2303/20* (2013.01)

(58) Field of Classification Search
CPC .. C02F 3/302; C02F 3/006; C02F 3/34; C02F 3/341; C02F 3/342; C02F 2101/163; C02F 2101/166; C02F 3/307; C02F 3/305
See application file for complete search history.

(56) References Cited

U.S. PATENT DOCUMENTS

| | | |
|---|---|---|
| 2018/0142537 A1 | 5/2018 | Baldoni-Andrey et al. |
| 2019/0112202 A1* | 4/2019 | Yangali-Quintanilla ................... |
| | | B01D 65/08 |

FOREIGN PATENT DOCUMENTS

GB      2581217 A *   8/2020    ........... G01N 17/008

\* cited by examiner

*Primary Examiner* — Benjamin L Lebron
*Assistant Examiner* — Bernadette Karen Mcgann
(74) *Attorney, Agent, or Firm* — KNOBBE, MARTENS, OLSON & BEAR, LLP

(57) ABSTRACT

A method and apparatus are provided for dosing biocide into fluid. A biofilm sensor configured to measure an amount of biofilm on the biofilm sensor is used. A method identifies, if present, in a data set representing measurement over time by the biofilm sensor a minimum and an inflection point and, if identified. According to some embodiments, dosing of biocide is determined to be effectuated when an inflection point has been identified occurring time wise after an identified minimum.

20 Claims, 5 Drawing Sheets

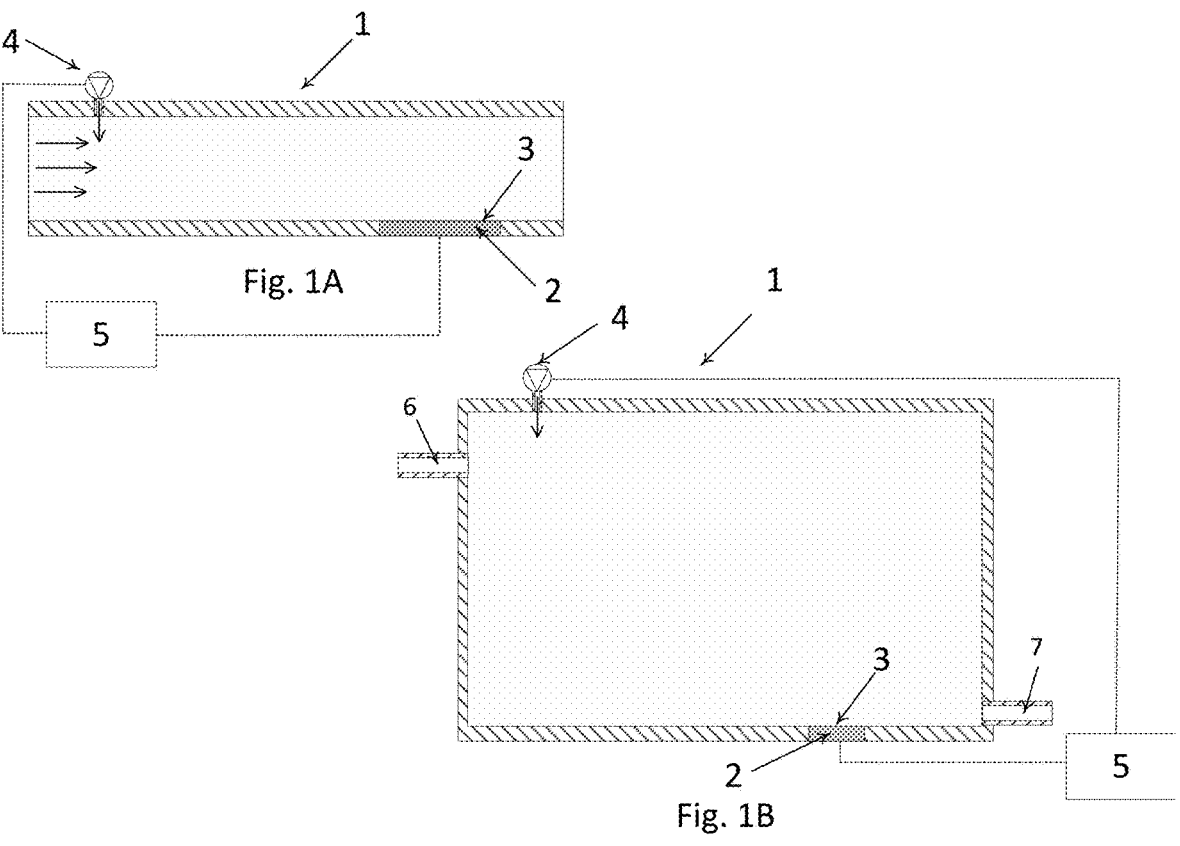
Fig. 1A
Fig. 1B
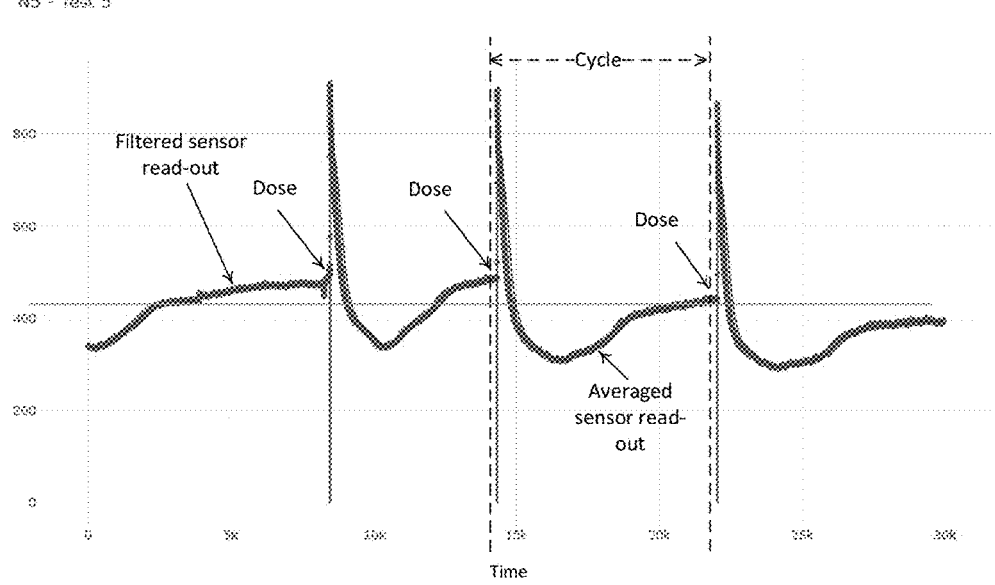
Fig. 2

METHOD OF DOSING BIOCIDE INTO A FLUID SYSTEM

The invention relates to a method and apparatus for dosing biocide into fluid. The invention typically utilizes a biofilm sensor configured to measure an amount of biofilm on the biofilm sensor. A method according to the invention identifies, if present, in a data set representing measurement over time by the biofilm sensor a minimum and an inflection point and, if identified. According to some embodiments, dosing of biocide is determined to be effectuated when an inflection point has been identified occurring time wise after an identified minimum.

BACKGROUND OF THE INVENTION

Water and life are omnipresent, and living bacteria in aquatic environments is the result of it. Bacteria in suspension is known as planktonic bacteria and when surfaces in an aquatic environment are prone to the attachment of bacteria the formation of a biofilm is imminent. Aquatic biofilm formation has three main different stages: (i) initial attachment, (ii) irreversible attachment, (iii) maturation. There are different types of bacteria in an aqueous environment, and some of them may have the proper conditions to grow and attach to surfaces. An example of a useful aquatic biofilm is activated sludge that may attach to media carriers and be used for the cleaning of wastewater. However, there are applications where biofilm should be avoided.

In the food and beverage industry, biofilm can affect the quality of products when processes are affected by biofilm formation (e.g. packaging, cleaning). One of the main problems in the food industry is the survival of foodborne pathogens due to insufficient cleaning of surfaces and/or instruments that come in contact with the food and that eventually are also in contact with water. Food contact surfaces must be clean and sanitized to avoid biofilm formation, contamination of the final product, and food poisoning.

A technology commonly used in various industries is cooling. Cooling towers are widespread across industries, water is recirculated in open cooling towers or in closed installations. In an open cooling tower, increasing the number of cycles is important for saving water, but problems such as biofilm may arise overtime because the water is not exchanged or not treated to avoid biofilm formation. Cooling towers are always connected to cooling heat exchangers, piping and pumps. The recirculation of the water in such a cooling application is the perfect environment for biofilm formation. Heat originates a rise in temperatures, water is evaporated in the cooling tower, nutrients enters from the open cooling tower and from water intrusion to the piping system. Moreover, the water network of cooling systems presents dead zones where the conditions of biofilm formation are favored.

Another application is water networks were biofilm formation is important to be monitored and controlled in order to avoid water quality problems and complaints from users. A residual effect of disinfectant (e.g. chlorine) is highly desirable in water networks, but this does not address the problem of biofilm since higher disinfectant doses or cleaning maintenance is needed to remove the biofilm. Water plumbing in buildings may suffer long periods of stagnant water were the formation of biofilm is favored, this represents a problem, that needs to be addressed by monitoring and removing biofilm. The risk of pathogenic bacteria types that are potential threats to public health are increased by the presence of biofilm. A problematic bacterium is *Legionella*, a rod-shaped gram-negative bacteria responsible for Legionnaires' disease.

Unitary processes of filtration and adsorption in water treatment are prone to biofilm formation. Depending on the water sources, biofilm formation can be intensified when waters are rich in nutrients (e.g. surface water, seawater, treated wastewater).

Additional industries where biofilm formation represents a problem are paper mills, metal/machine industry, oil & gas. The marine industry and marine environments are heavily affected by corrosion problems caused by biofilm formation. The marine environment suffers from corrosion, and apart from regular chemical corrosion (such as that from the salt in seawater), studies show that microorganisms (in the form of complex biofilms) directly participate in the corrosion process or accelerate/influence the corrosion action. Microorganisms present in biofilm degrade metal surfaces and cause crevices and pitting.

Biofilm formation typically begins by free-floating microorganisms such as bacteria that becomes attached to a surface and creates what may be labelled a colony. If such a colony remains at the surface, a colonization occurs during which the colony is said to be irreversibly attached to the surface, in the sense the normal fluid flow cannot tear-off the colony from the surface. When this has happened, the need for use of a biocide becomes present.

At some later point in time, the colony can be characterized as being a full grown biofilm and it enters into what may be labelled a dispersal stage during which the colony releases microorganisms which may form new colonies.

When the biofilm has become full grown, it has been found to be quite difficult to remove it, and removal often requires extensive use of chemicals and in some cases even a mechanical cleaning may be needed to remove the biofilm.

Thus, it may be seen to be of advantage to detect the stage(s) where the biofilm may be relatively easier to remove typically by use of a biocide. However, a "rough" biofilm sensor, e.g. measuring the thickness of the biofilm, may not as such produce useable measurement.

OBJECT OF THE INVENTION

It is an object of the invention to provide a method and apparatus which optimizes or at least mitigates the problems related to an extensive use of a biocide for removal of biofilm.

It is another object of the invention to provide a method and apparatus which at least mitigates problems in relation to prior art methods of removal of biofilm by use of a biocide.

SUMMARY OF THE INVENTION

In a first aspect, the invention relates to method of dosing biocide into a fluid system, the method may be carried out after a, such as between two subsequent, dosing of biocide into the fluid system.

A fluid system according to preferred embodiments of the invention may comprise a biofilm sensor arranged in the fluid system and having a sensing surface exposed to a flow fluid in the fluid system, when fluid is present in the system. The sensor may be configured to measure an amount of biofilm on said sensing surface of the biofilm sensor. The fluid system may further comprise a dosing pump arranged in the fluid system to dose biocide into fluid system. According to a first aspect, the method may be carried out in a number of sequences on the basis of data sets representing measurements of the amount of biofilm subsequent to a most recent dosing of biocide. Such a sequence may comprise the steps of:

i) identifying, if present, in said data set a minimum and, if identified, record that a minimum has been identified;

ii) identifying, if present, in said data set an inflection point and, if identified, record that an inflection point has been identified;

iii) if an inflection point has been identified occurring time wise after an identified minimum, determining a point in time for dosing by use of the dosing pump biocide into the fluid system.

If an inflection point has not been identified occurring time wise after an identified minimum, the method may obtain a new data set by appending new available data, if any, to said data set and execute steps i)-iii) on the new data set until step iii) is fulfilled;

The point in time for dosing may be determined by, preferably recurrently, obtaining a new data set by appending new available data, if any, to a current data set and determine the point in time where the data set fulfils a predefined dosing criteria.

The method may further comprise the step of dosing by use of the dosing pump biocide into the fluid system when said predefined criteria is fulfilled.

The invention may not necessarily strive at removing all biofilm since this could represent a too massive dosing. Thus, in some embodiments, the technical effect of the invention may be that not all biofilm is removed but the level of biofilm is at an acceptable level. While this may be controlled by determining the time of dosing alone, the amount dosed of biocide may be taken into consideration.

Words used herein are used in a manner being ordinary to a skilled person. However, some the words used are elaborated in the following:

"Amount of biofilm" is preferably meant to reference e.g. a percentage of a surface covered by biofilm. For some specific electrochemical biofilm sensors, the readout is proportional to the percentage of the sensor surface covered by biofilm. In general, the amount of biofilm may be considered as being application specific and depending on the sensing principle applied by the sensor. However, the sensor readout at least represent the amount of biofilm on the sensor at least until (for some sensors) where the sensor is no longer capable of detecting a further growth of biofilm.

The method aspect and embodiments of invention may preferably be computer implemented, where computer implemented is considered in a broad context to comprises an electronic processing unit and memory, e.g. forming a control unit.

"Fluid system" is used herein preferably to designate a physical entity preferably with a flow of a fluid. Such a system may be, but is not limited thereto, to a tank having a void adapted to hold a fluid, a flow line, pipe line system, membrane systems.

"Fluid" as used herein is typically used to reference a liquid, but the invention is not limited to liquid and may relate to gas or even a combination of liquid and gas. In many embodiments according to the present invention, the liquid is water or an aqueous solution, e.g. drinking water, process water, surface water, seawater, treated wastewater.

"Biocide" as used herein preferably refers to a chemical substance or microorganisms capable of or intended to destroy, deter, render harmless, or exert a controlling effect on any harmful organism. Biocide may comprise a sterilizer, a turberculocide, a disinfectant, a fungicide, a virucide, a sanitizer or a combination thereof. Particular substances may be but not limited to hydrogen peroxide, chlorine or iodine halogens, chlorine dioxide, DBNPA (2,2-dibromo-3-nitrilopropionamide), aldehydes, quaternary, ammonium compounds or a combination thereof.

By "cycle" is preferably meant a time period between two consecutive dosings of biocide or alternatively, the time period between onset of a method according to the present invention and until the time of dosing determined by a method according to the present invention.

Sequence is preferably meant to reference a sequence of steps and/or actions repeatedly carried out within a cycle.

Global and local as used in global/local minimum and in global/local inflection point are preferably used as being ordinary within mathematics. However, global and local are used to labelling such a minimum and inflection within a cycle. Thus, over time where a number of cycles are carried out, a plurality of global/local minima and inflections points are determined.

"Slope" as used herein is preferably used to mean a slope of a curve as ordinarily used. The slope may mathematically be determined as the first derivate, e.g. for $y=ax+b$, "a" is the slope. However, since this requires a continuous function and the present invention operates on discrete data a first or higher order approximation is typically used to estimate the slope.

"Tangent" as used herein is preferably used to reference the operator tan(angle). With reference to the concept "slope" introduced above this slope may be considered as "slope=tan(angle)". Accordingly, the angle may be determined as arc tan (slope).

In preferred embodiments the dosing criteria to be fulfilled may comprise that the magnitude of the measurements asymptotic goes towards a constant value. Determination of when the magnitude of the measurements go toward a constant value may be evaluated by considering rate of change of the magnitude measurement, and determining that the asymptotic behaviour has been reached when the rate of change is less than a predefined threshold, where the predefined threshold can be found by experiments. The rate of change may be determined by $\Delta$ magnitude/$\Delta$ t.

In preferred embodiments, the number of sequences may further comprise determining a slope or an angle corresponding to the slope in the data set time wise after the occurrence of the inflection point (IP) and determining the point in time to initiate dosing biocide based changes in the determined slopes or angle corresponding to the slope.

In preferred embodiments, the dosing criteria to be fulfilled may comprise that the angle corresponding to the slope pass a predefined threshold, preferably selected between tangent of angles 10-30 degrees, or tangent of angles preferably such as less than 40.

In preferred embodiments, the dosing criteria to be fulfilled may comprise that the angle corresponding to the slope pass a predefined threshold, preferably selected between tangent of angles ($\gamma$, $\lambda$) between 30 and 40 degrees, or preferably greater than 40 and less than 60.

In preferred embodiments, the dosing criteria to be fulfilled may comprise that the angle corresponding to the slope pass a predefined threshold, preferably selected between tangents of angles ($\varphi$, $\psi$) 50 and 70 degrees, or preferably more than 70 and less than 90.

In preferred embodiments, number of sequences further may comprise fitting a linear line to a subset of data after step iii), determining a correlation coefficient between the linear line and the data of the data set and determining the point in time to initiate dosing of biocide at the point in time where the correlation coefficient becomes larger than a preselected number, such as larger than 0.9, preferably larger than 0.95, such as larger than 0.99.

In preferred embodiments, the dosing criteria to be fulfilled may further comprise that the magnitude of the data representing measurements of the amount of biofilm is above a predefined reference magnitude.

In preferred embodiments, the method may further comprise recording for a number of subsequently identified minima, for each of which an inflection point has been identified time wise after, the magnitude of the minima, determining whether the magnitudes of the minima are increasing over time, and if the magnitudes are increasing over time, increase the amount of biocide dosed into the fluid system in one or more subsequent dosing.

In preferred embodiments, the method may further comprise recording for a number of subsequently identified minima, for each of which an inflection point has been identified time wise after, the magnitude of the minima, determining whether the magnitudes of the minima are decreasing over time, and if the magnitudes are decreasing over time, maintain a current amount of biocide dosed into the fluid system in one or more subsequent dosing.

In preferred embodiments, the method may further comprise recording for a number of subsequently identified minima, for each of which an inflection point has been identified time wise after, the magnitude of the minima, determining whether the magnitudes of the minima are essentially constant over time, and if the magnitudes are essentially constant over time, decrease the amount of biocide dosed into the fluid system in one or more subsequent dosing.

In preferred embodiments, the increase or decrease in magnitude of the minima may be determined based fitting a straight line through the minima considered and if the correlation coefficient is larger than predefined number, such as larger than 0.9, the slope of this fitted line is used to determine whether the minima are decreasing or increasing, the fitted straight line preferably takes as variables counts of minima (1, 2, 3, . . . n) and the values of the minima.

In preferred embodiments, the set of data representing measurements of the amount of biofilm may be obtained by filtering read-outs from the sensor and applying preferably a moving mean algorithm preferably having a predefined window size on the filtered read-outs.

In preferred embodiment, a minimum may be identified as a change in slope from smaller than zero to larger than zero, the slope is zero, or the angle corresponding to the slope, preferably evaluated as tan to slope, changes sign from negative to positive.

In preferred embodiments, an inflection point may be determined as a rate of change in slope or the angle corresponding to the slope from increasing to decreasing.

In preferred embodiments, the method may be essentially carried out synchronized with the occurrence of data, such that a sequence is based on a data set comprising most recent available data.

In a second aspect the invention relates to a fluid system comprising a biofilm sensor arranged in the fluid system and having a sensing surface exposed to a fluid in the fluid system. The sensor is typically configured to measure an amount of biofilm on said sensing surface of the biofilm sensor. The fluid system preferably also comprises a dosing pump arranged in the fluid system to dose biocide into fluid system. The fluid system preferably also has a control unit configured for carrying out the method according to the first aspect of the invention, and as a result thereof activating the dosing pump.

In a third aspect, the invention relates to a dosing pump preferably comprising an electronic controller, such as an PLC controller, where the electronic controller is configured to receive sensor read-outs from a biofilm sensor and to carry out the method according to the first aspect of the invention.

BRIEF DESCRIPTION OF THE FIGURES

The present invention and in particular preferred embodiments thereof will now be described in more detail with regard to the accompanying figures. The figures show ways of implementing the present invention and are not to be construed as being limiting to other possible embodiments falling within the scope of the attached claim set.

FIGS. 1A and 1B schematically illustrate two flow systems according to preferred embodiments of the invention in cross sectional views;

FIG. 2 illustrates an example on sensor readouts affected by dosing of biocide according to a preferred embodiment of a method of dosing biocide into a fluid system. The results presented are obtained by use of an electro-chemical sensor type;

DETAILED DESCRIPTION OF PREFERRED EMBODIMENTS

Figure 3:
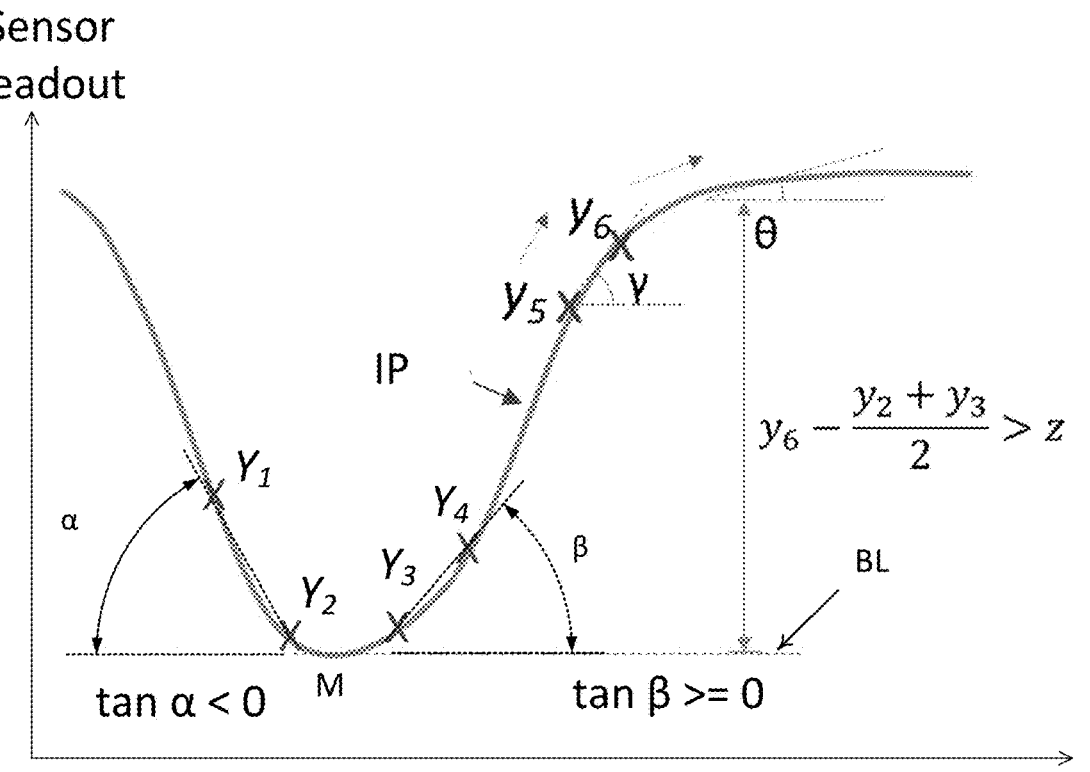
FIG. 3 illustrates an idealised sensor readout and criteria according to preferred embodiments of the invention.

Reference is made to FIG. 1a and FIG. 1b schematically illustrating two different fluid systems. The fluid system 1 shown in FIG. 1a is a tubular connection, which in practise, forms part of a larger fluid system. As indicated, the fluid flows as an example from left to right towards a biocide sensor 2, but the invention is not limited to such a flow situation.

The fluid system 1 shown in FIG. 1b is a tank being adapted to contain a fluid. In many implementations, there will be a flow of the fluid e.g. by the fluid system as illustrated having and inlet 6 for inletting fluid into the tank and an outlet 7 for outletting fluid from the tank. However, the invention is not limited to flow being created by a flow in and out of the tank as the tank may comprises an agitator and/or a flow is generated by feeding fluid into and out of the tank.

As also illustrated in FIG. 1, the fluid system 1 has a biofilm sensor 2 arranged in the fluid system 1. This biofilm sensor 2 is arranged so that its sensing surface 3 is exposed to a fluid present in the fluid system. Many of such biofilm sensors 2 detects the amount of biofilm deposited on its surface so that the sensor is configured to measure an amount of biofilm on the sensing surface 3 of the biofilm sensor 2. Such a sensing could be detecting the thickness of the layer and/or the percentage of the exposed surface covered by a biofilm layer. In practical implementations, the amount of biofilm on the surface is taken as a measure for the state of biofilm in the fluid system.

The actual positioning of the biofilm sensor typically varies depending on the layout of the fluid system, and it may be necessary to carry out experiments to determine a good location of the biofilm sensor. As a rule of thumb, the biofilm sensor 2 should preferably be positioned in a position where biofilm formation is representative for the state of biofilm formation in the fluid system or a part of a larger system that one aims at monitoring. Further, it should be avoided to place the sensor in fluidic dead-zones, such as in a recirculation zone. Further, areas with a boundary shear not representing a prevailing shear in the system could also advantageously be avoided, since a high shear may have a tendency to tear-off biofilm. Turbulence may also play a role, since generation of turbulence may increase in downstream direction and such increased turbulence may at one hand increase transportation of nutrients towards a surface of the fluid system thereby potentially increase biofilm formation and on the other hand represent a higher shear force on biofilm with a tendency to tear off biofilm Often experiences obtained in a specific fluid system provides information as to areas where growth of biofilm is most prevailing and in such system it may be suggested to place the biofilm sensor in such an area.

Another approach could be to carry out CFD simulations which may include a model for biofilm growth and carry out computational experiments to either locate biofilm formation "hot spots" (areas with high growth rates) or flow scenarios that potentially could lead to such hot spots. One approach could then be to locate the biofilm sensor close to or at such hot spots.

As indicated in the above, the invention is not limited to only applying one biofilm sensor. In some preferred embodiments more than one biofilm sensor such as two or more may be installed. A method according to the invention may in such embodiments be executed in parallel for each sensor and dosing is preferably initiated when a first of the sensors produces measurement fulfilling the various criteria imposed according to the invention.

One aim of the invention is preferably to dose a biocide into the fluid system. To fulfil this, the fluid system has a dosing pump 4. In the disclosed embodiments of FIG. 1*a* and FIG. 1*b*, the dosing pump 4 is disclosed schematically with a pump symbol and a connection into the fluid system through which the biocide is dosed. In a physical implementation, the pump is typically connected at its suction side to a reservoir containing the biocide and connected at its pressure side to an injection device to inject biocide into the fluid system. The dosing pump 4 is typically a metering pump in the sense that the dosed amount can be controlled so as to deliver a prescribed amount of biocide.

In FIGS. 1*a* and 1*b* a control unit 5 is also disclosed. The control unit 5 is connected to receive the readouts from the biofilm sensor 2, process the readouts and preferably instruct the dosing pump 4 to dose based on the methods according to the invention. The connections, typically being electrical, wireless or optical, such as IR-transmission of nature, are illustrated in FIGS. 1*a* and *b* with dotted lines. The control unit in FIGS. 1*a* and 1*b* is disclosed as a stand-alone unit. However, as will be disclosed below, the control unit 5 may be embedded e.g. in the dosing pump 4 (or in other positions). In embodiments, the control unit has a control unit for controlling the operation of the pump, and the various steps according to preferred embodiments may be embodied in loading an instructions set (program) to the controller of the pump.

FIG. 2 illustrates an example on sensor readouts affected by dosing of biocide according to a preferred embodiment of a method of dosing biocide into a fluid system. The figure illustrates a filtered sensor read-out, that is the raw electrical signal from the sensor filtered to remove noise in the signal. The figure also illustrates the filtered sensor read-out being averaged (the averaging method used will be disclosed below). As can be seen in the figure, a certain kind of periodicity is present and this is based on that the method operates in cycles where a cycle preferably extends between two subsequent dosings of biocide into the fluid system. In FIG. 2, three such dosings are indicated and the extent of a cycle is show by dotted lines. The measurements are recorded as data, typically in a form of data pairs comprising a measurement and the time it has been recorded e.g. as data structure:

| $Y_1$ | $Y_2$ | $Y_3$ | $Y_n$ |
|---|---|---|---|
| $t_1$ | $t_2$ | $t_3$ | $t_n$ |

"Y" is the value of the measurement, and "t" is the point in time of the measurement. Index 1 . . . n is a counter, not necessarily forming part of the data structure.

The method is preferably carried out on most recent measurements in order to track the evolution of biofilm formation. By most recent measurements is typically meant that some collection may be used so as to e.g. carry out a sequence when a predefined time has passed. This also means, that the method is carried out in sequences where one sequence is carried out at one point in time say at $t=100$ minutes after initiation of a cycle that is carried out on data spanning $[t_1;t_{100}]$. At a later point in time, say $t=200$ minutes, a subsequent sequence is carried out on data spanning $[t_1;t_{200}]$. "$t_1$" refers to the first measurement after beginning of a cycle, which may be the first usable measurement after beginning of a cycle. It noted, that by carried out on data spanning times does not imply that all data is taken into consideration (as will be detailed below), but preferably only that the data is available at the point in time where a sequence is carried out. Preferred steps involved in a sequence are disclosed in the following with reference to FIG. 3.

FIG. 3 illustrates an idealised sensor readout (by readout is meant that the curve presented is a smooth curve conceptually illustrating an actual sensor readout). The method according to preferred embodiments is based on that dosing is to be carried out when an inflection point IP is identified as occurring timewise after an identified minimum M (see FIG. 3). Kindly note that the point in time of dosing is not indicated in FIG. 3, since FIG. 3 is supposed to illustrate on a conceptual basis, various criteria that may be applied in the present invention.

A sequence may typically comprise the steps of:
i) identifying, if present, in said data set a minimum M and, if identified, record that a minimum M has been identified;
ii) identifying, if present, in said data set an inflection point IP and, if identified, record that an inflection point has been identified;
iii) if an inflection point IP has been identified occurring time wise after an identified minimum M, determining a point in time for dosing by use of the dosing pump 4 for input of biocide into the fluid system 1.

Step i) may comprise two or three different actions, namely:

a) analysing data set to identify a minimum, and/or b) identify whether a minimum has previously been identified in a data set and go to step iii)

In one embodiment, the step i) is implemented in a manner where a flag is set indicating that neither of a) nor b) is to be executed. In other embodiments, step a) is to be carried out irrespective of whether a minimum has already being identified. This is detailed even further below.

Since the data set at a given time may contain a minimum and/or a inflection point or none of these, the method operates in sequences. For instance, at some point in time a data set comprising measurements spanning say $[t_1; t_{100}]$ does not contain either a minimum M or an inflection point IP, and the sequence is repeated, when new data is(are) available. The sequence is repeated with such new data appended to a data set of a previous sequence carried on, whereby a subsequent sequence is carried out on e.g. measurements spanning $[t_1; t_{200}]$. This is repeated until an inflection point IP is identified as occurring time wise after a minimum M in the data set. When this has been identified, the method continues with carrying out a routine to determining a point in time for dosing.

This may be summarized as if an inflection point IP has not been identified occurring time wise after an identified minimum M, then the method obtains a new data set by appending new available data, if any, to a previous data set, such as a current data set being the one most recently operated on, and executes steps i)-iii) above on the new data set until step iii) is fulfilled.

FIG. 3 schematically illustrates one way of identifying a minimum M and an inflection point IP. The disclosed way of identifying a minimum comprises evaluating the angle (or slope of angle) between two data points say $Y_{n+1}$ and $Y_n$. As illustrated in FIG. 3, the slope changes sign when passing a minimum. In FIG. 3, this is disclosed as $\tan \alpha < 0$ before the minimum and $\tan \beta \geq 0$ after a minimum. Thus, by such an evaluation of the slope of the angles, it can be derived that a minimum has been identified to be located between $Y_{n+2}$ and $Y_{n+1}$. As indicated in the figure, there are typically a plurality of measurement data between $Y_{n+1}$ and $Y_n$ and the actual selection of which measurement is to be used as $Y_{n+1}$ and $Y_n$ may be made in a number of ways. Often, experiments are carried out to determine such Y's. Based on experiments, a time scale of the fouling can be determined, say the time spent after a dosing and before measurement asymptoticly goes towards a constant value. Based on this, a time scale sufficiently short to decompose the evolution of biofilm may be determined. For instance, in case the fouling constant is determined as 20 hours, a time scale can be selected as 5% of the fouling constant i.e. 1 hour. In other embodiments, the time scale could be selected as correlated with the sampling rate, e.g. if the sampling rate is 1 samples per minute, the time scale could be selected as 100 divided by 1 sample per minute, that is 100 minutes. However, the invention is not limited to such sampling rate.

As will be disclosed below, the value of the minimum M is used e.g. for evaluating the effect of the amount dosed and the numerical value of the minimum can be found in the data set by seeking the lowest value between the data points where a minimum M is found.

Similarly, an inflection point IP can be determined when the rate of change in slope changes from increasing to decreasing.

Alternatively, to determining the angles, finite difference operators can be applied where for example an inflection point can been identified when:

$$(Y_{n+1}-2Y_n+Y_{n-1})/(0.5*(t_{n+1}-t_{n-1}))$$

changes sign. It is noted, that the denominator can be left out of the calculation, as the aim is to determine when a change in sign occurs.

When an inflection point IP is identified as occurring after a minimum the method continues with determining an actual point in time for dosing. The method continues by recurrently obtaining a new data set by appending new available data, if any, to a current date set as disclosed above. The actual point in time for dosing can be predefined in a number of ways, and can be summarised as the point in time where the data set fulfils a predefined criteria. Various criteria are disclosed below. Once the criteria is fulfilled, the dosing pump 4 is instructed to dose biocide and the dosing pump 4 dosses biocide into the fluid system. That the pump is instructed to dose is based on an implementation where the pump has its own control system and a method according to the invention is implemented outside the pump's control system. If a method according to the invention is implemented in the control system of the pump, the pump's control system is programmed to dose when the criteria as outlined herein is met.

Depending on the particular implementation, an ongoing cycle is defined to be completed either when the criteria for dosing is fulfilled or when dosing has been completed. Prior to initiating a new cycle, the data set on which the sequences of a cycle has been carried out is preferably discarded in the sense that a new cycle does not contain measurement from a previous cycle. Thereafter a new cycle, executable similar or identical to the previous, is typically initiated. It is noted, that it is not mandatory for the invention, that a new cycle is initiated.

Figure 5:
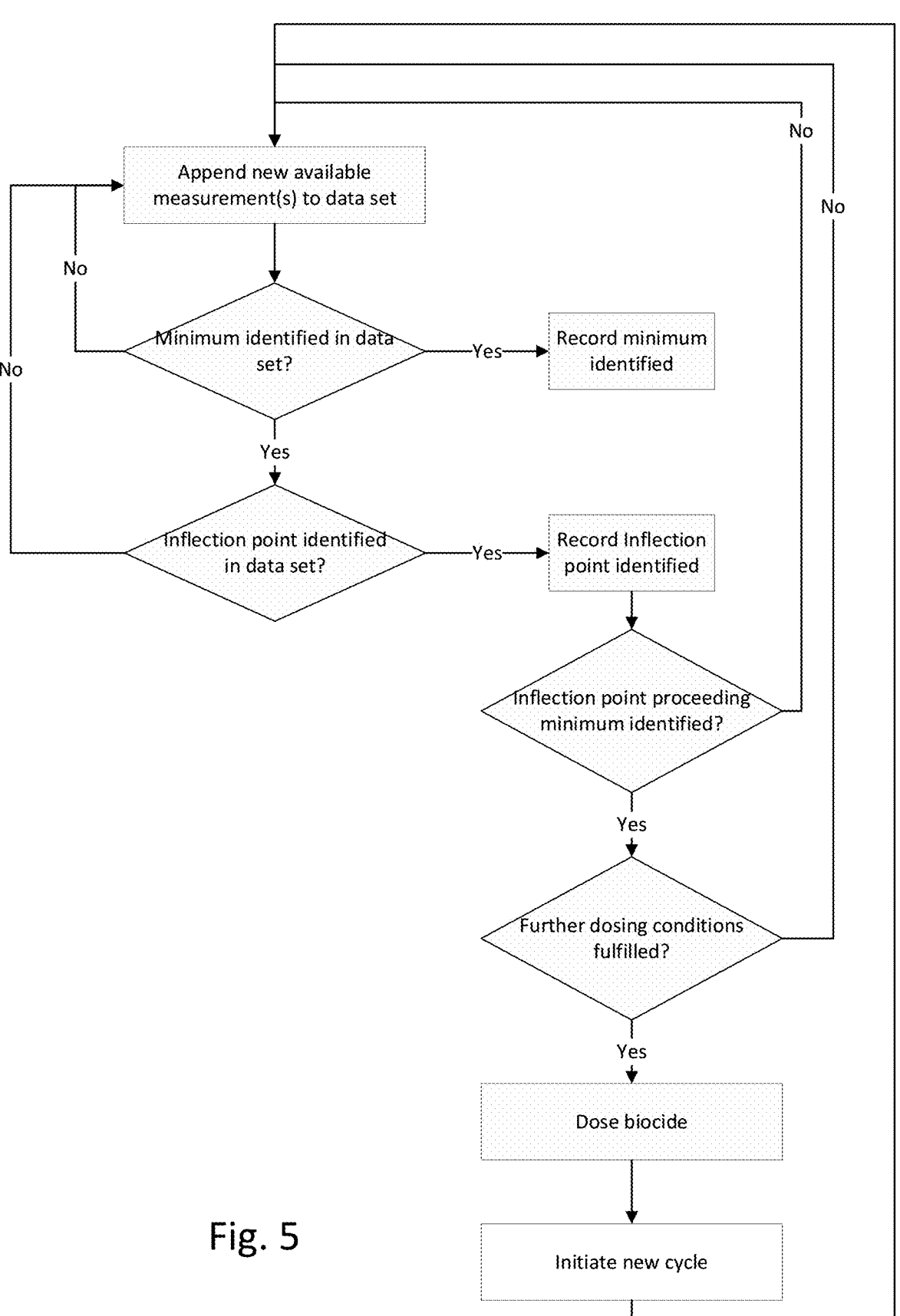
FIG. 5 schematically illustrates a preferred embodiment of the method in context of a flow chart.

FIG. 5 schematically illustrates the above preferred embodiment in context of a flow chart. The flow chart is initiated by appending new available measurement(s) to a data set. Whether one or more measurements are appended is typically based on the time difference between two sequences and the sampling rate of the measurement from the sensor and can be selected as desired as long as the time difference is not so long that an inflection point cannot be captured before determining the point in time for dosing.

As can be seen in FIG. 5, the method looks for a minimum M. If a minimum is not identified, the method reverts to the step of appending new measurement(s).

The decision in FIG. 5 "Minimum identified in data set ?" can be fulfilled either by a) a present sequence identifies a minimum, or b) a minimum has been identified in a previous sequence.

It has been found that measurements may contain what may be called a false minimum since it represents a local and not a global minimum. To avoid basing fulfilment of the criteria for dosing on such a local minimum a sequence may be carried to include the step of identifying a minimum, and if a new minimum is identified then replacing a previous identified minimum with the newly identified. Such a replacement is in some preferred embodiment to be carried out under the provision that the newly found minimum has a smaller value than the previous.

It is noted that the order in which the steps are presented in FIG. 5 is not considered limiting to the present invention, since the steps may be ordered in a different manner.

If a minimum is identified, this is recorded. If a minimum is identified, the method continues with identifying an inflection point IP, and if identified, this is recorded. If not, the method goes back to the initial step. If inflection point IP is identified, the method checks whether the inflection point IP occurs timewise after an identified minimum M. If not, the method goes back to the initial step. If yes, the method proceeds towards dosing. When dosing is completed, a new cycle is to be carried out.

In FIG. 5, an optional decision procedure is disclosed, namely further dosing conditions to be fulfilled. Such further dosing conditions may be one or more of the criteria disclosed herein.

It is noted, that the measurement on which preferred embodiments of the invention operated within a given cycle is preferably restricted to data only obtained during the cycle in question.

As presented above, dosing is to be carried out after a global inflection point IP has been identified timewise after a global minimum M within a cycle. There are a number of different strategies one may adopt in order to select actual point in time to dose biocide. As can be realized from FIG. 3, the value of the measurement goes asymptoticly towards a constant value, which can be referred to as a plateau. This plateau represents that the formation of biofilm goes towards a situation where the sensor is no longer capable of measuring a further growth. This can be referred to as the sensor readout has reached a steady state where the signal may no longer increase, although the biofilm formation may continue. It is therefore often preferred to dose before such a plateau is reached. A characterizing feature of the data after the inflection point is that the slope or an angle corresponding to the slope decreases and this can be used to determine when to dose.

Accordingly, for some embodiments of the invention, the number of sequences further includes a step of determining a slope or an angle corresponding to the slope in the data set time wise after the occurrence of the inflection point (IP).

The point in time to initiate dosing of biocide is then based on changes in the determined slopes. It is noted that depending on the implementation, either the angle corresponding to the slope is determined directly or derived from the slope. When derived from the slope, the angle may be determined by evaluating arc tan (slope).

The concept of angle corresponding to the slope is illustrated inter alia in FIG. 3. Considering the two points $Y_1$ and $Y_2$. The straight line between the two data points has a slope of $$slope = Y_2 - Y_1/\Delta t$$

where $\Delta t$ is the time difference between the two data point. The slope calculated in this manner is a first order approximation to slope the curve of data points midway between the two data point. The straight line defines an angle $\alpha$ with respect to the time axis. Accordingly, this angle is said to be the angle corresponding to the slope.

In one attempt, dosing is pre-selected to occur when the plateau has emerged. This would require that the slope or the angle corresponding to the slope is determined to be zero or close to zero, and this may take a long time to reach this target, during which other parts of the system may experience an undesirably high rate of biofilm formation. In an attempt to avoid such effects, it may be advantageous to use the dosing criteria to be fulfilled, that the angle corresponding to the slope pass a predefined threshold. The actual value of the predefined threshold may be found by experiments, although good candidates for the threshold for the slope have been found in connection with the present invention to be between tangents of angles 10 to 30. Another candidate may be a tangents of angles less than tangent of 40 degrees.

In other embodiments, dosing is selected as to be carried out close to the plateau. This has inter alia the advantage that dosing is done close to the point in time where the sensor is no longer capable of measuring a further growth, whereby dosing may be carried out most cost effective compared to a situation where dosing is repeatedly done in consecutive cycles earlier than close to the plateau. Also in such embodiment, this may be implemented by examining the evolution of the angle corresponding to slope after the inflection point IP and implementing that the dosing criteria to be fulfilled includes that the angle of the slope pass a predefined threshold. When dosing closely to the plateau the actual value of the threshold may be determined based on experiments, although good candidates for the threshold for the angle corresponding to the slope have been found in connection with the present invention to be between, between tangents of $(\gamma, \lambda)$ 30 and 40 degrees. Another good candidate could be selected between greater than 40 and less than 60 degrees.

In still other embodiments, one aim dosing close to a point in time after the inflection point IP. Since the biofilm sensor, at least presumable, mirrors the state of the fluid system, the aim can be seen as a measure to avoid larger build-up of biofilm in the fluid system. Also in such embodiments, the dosing criteria to be fulfilled may include that the angle corresponding to the slope pass a predefined threshold. In embodiments included dosing closely after the inflection point IP, the actual value of the threshold may be determined based on experiments, although good candidates for the threshold for the angle corresponding to the slope have been found in connection with the present invention to be between, between tangents of $(\varphi, \psi)$, 50 and 70 degrees. Other good candidates could be selected between more than 70 and less than 90 degrees.

It is noted that since an arithmetic relationship exists between slope and angle corresponding to the slope, the various criteria and evaluations disclosed herein are interchangeable at least by use of the arithmetic relationship.

Figure 4:
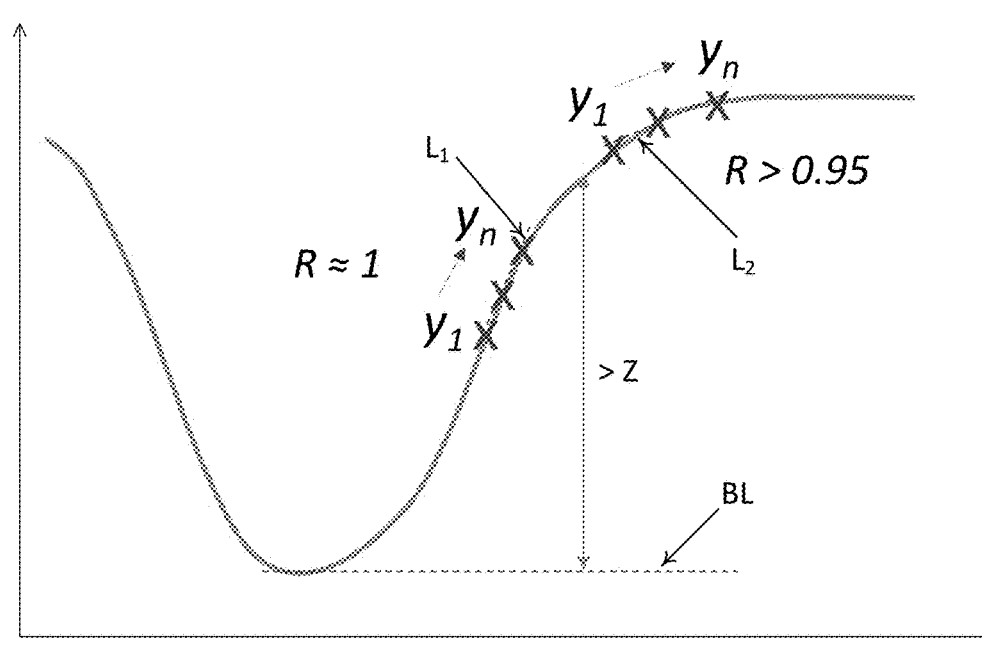
FIG. 4 illustrates an idealised sensor readout and criteria according to preferred embodiments of the invention.

In still other embodiments, the point in time for dosing is determined by fitting a linear line to a subset of data. The subset of data is data selected to be data after step iii) above, that is after and inflection point IP has been identified as occurring after a minimum M. The procedure, which is schematically illustrated in FIG. 4, includes the determination of a correlation coefficient between the linear line and the data of the data set. In FIG. 4, two such linear lines $L_1$ and $L_2$ are shown. The first one $L_1$ is shown to have a correlation coefficient R around 1 with the data to which it is fitted and the other one $L_2$ is shown to have a correlation coefficient slightly larger than 0.95. In terms of determining the time of dosing, this behaviour in the data is used to initiate dosing of biocide at the point in time where the correlation coefficient becomes larger than a preselected number, such as larger than 0.9, preferably larger than 0.95, such as larger than 0.99. It is noted that the correlation coefficient after the inflection point IP may decrease and at some point after in time the decrease and at some point in time changes into increase. Thus, in a practical implementation, it may be necessary to impose a further criteria to avoid dosing immediately after and inflection point, since immediately after the inflection point the correlation coefficient may be e.g. larger than the preselected number.

When identifying an inflection point IP occurring after minimum, the method may identify what may be termed a false minimum and/or a false inflection point. "False" is in this context used preferably to reference that the minimum M and/or inflection point IP identified is/are not global in the sense that the globally characterizes the evolution in the data representing the measurement.

One such example could be that a global minimum M (i.e. a correct minimum) has been identified and immediately after an inflection point IP is identified. However, although the slope of the curve changes sign from positive to negative, data at a later point in time, and before the plateau, has another inflection point where the slope of the curve changes from negative to positive. Thus, the first identified inflection point is not a global inflection point and in some embodiments it is not desired to use such a false inflection point IP for determining when to dose biocide. In preferred embodiments, this has been taken care of by the criteria to be fulfilled further includes that the magnitude of the data representing measurements of the amount of biofilm is above a predefined reference magnitude Z.

This is illustrated in FIGS. 3 and 4. The reference magnitude Z is preferable defined relatively to a baseline BL (see FIGS. 3 and 4). This baseline could take the value of the global minimum M, if identified. Otherwise, the minimum value found in the measurements can be used as value for the baseline BL. The actual value of the reference magnitude Z is typically a fixed and predefined value typically depending the sensor type used. The determination of Z can be made by experiments. As illustrated in FIG. 3, one way of implementing this further requirement includes evaluation of the following equation:

$$Y_6 - \frac{Y_2 + Y_3}{2} > Z$$

Kindly observe, that although this equation is given with reference to FIG. 3, the Y's can be selected differently than indicated in FIG. 3. Z may in some preferred embodiments be determined as a predefined magnitude, preferably measured from a baseline which may be a horizontal line passing through the global minimum. Thus, Z can be determined or selected in different ways not necessarily resembling the disclosure presented with reference to FIG. 3 or 4.

Another advantage of preferred embodiments of methods according to the invention is its possibility of tracking the effect of dosing in different, typically consecutive, cycles. It has been found in connection with the present invention that the value of the global minima in a cycle is the result of the actual dosing at the beginning of the cycle, such as the amount of biocide dosed. It has been found that when the value of the global minimum in a cycle increases from cycle to cycle, the amount dosed is not enough to remove the biofilm on the biofilm sensor 3.

Figure 7:
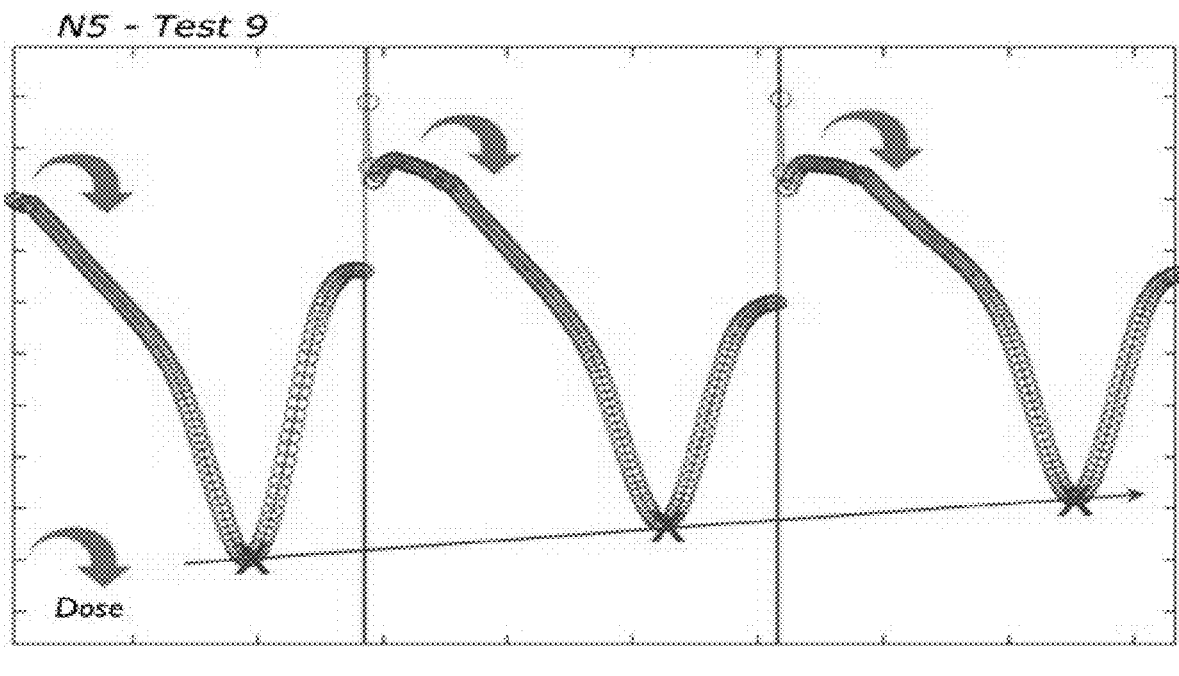
FIG. 7 illustrates sensor readout for three consecutive cycles; the upper part of FIG. 7 illustrates an increase in global minima from cycle to cycle, whereas the lower part of FIG. 7 illustrates a decrease in global minima from cycle to cycle.
Figure 7:
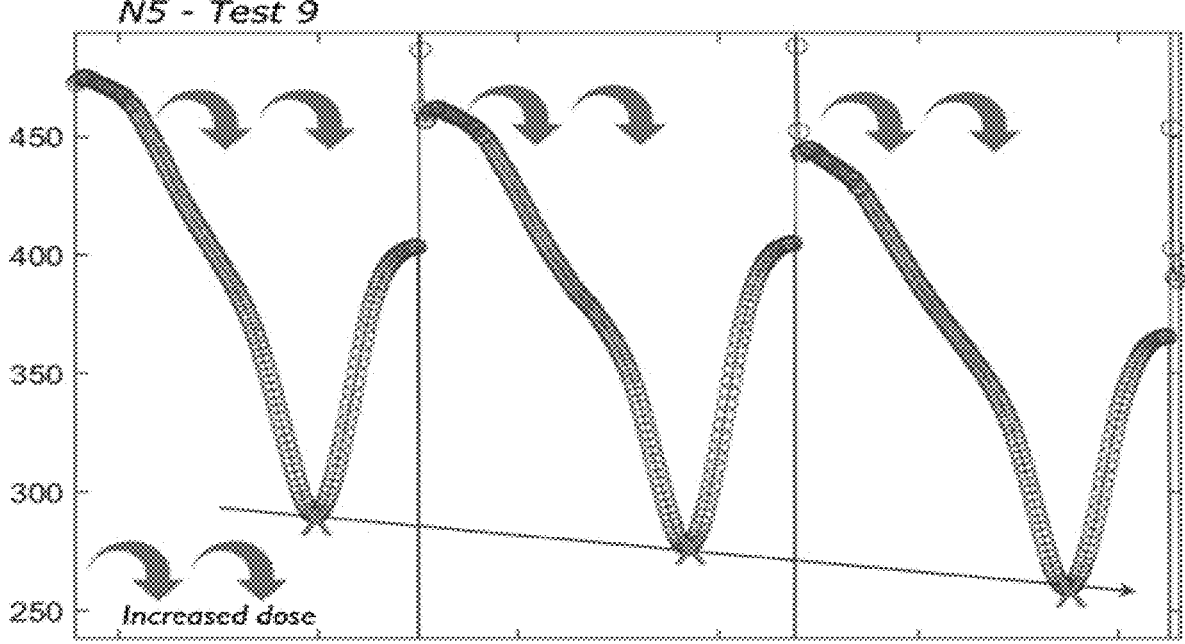

This is illustrated in upper part of FIG. 7 illustrating sensor readout for three consecutive cycles, in which three global minima are labelled $GM_1$, $GM_2$ and $GM_3$ respectively. The experiment is carried out without any change in dosing between the cycles. As is apparent from the figure, the global minima are increasing.

Accordingly, in embodiments of the invention, the method further comprises that for a number of subsequently identified global minima M's, for each of which a global inflection point (IP) has been identified time wise after, the magnitudes of the minima are recorded. The number of subsequently identified minima could be three, four, five, six or even more.

When the magnitudes of the global minima are recorded, the method determines whether the magnitudes of the minima are increasing over time. If the magnitudes increase over time, this represent, typically, that an insufficient amount of biocide is dosed and the method, preferably, increases the amount of biocide dosed into the fluid system in one or more subsequent dosing.

Lower part of FIG. 7 illustrates a scenario in which the global minima are decreasing between consecutive cycles. The experiment is conducted with an increasing doses between cycles.

In case the magnitudes of the global minima M's are decreasing over time, this typically represents a scenario in which the amount dosed into the system is sufficient to eventually remove all biofilm in a later cycle, that the dosing is sufficient to maintain the amount of biofilm at an acceptable level. Accordingly, in embodiments of the invention, the method further comprises recording for a number of subsequently identified global minima M's, for each of which a global inflection point (IP) has been identified time wise after, the magnitudes of the minima. Also in this case, The number of subsequently identified global minima could be three, four, five, six or even more. When the magnitudes of these global minima are recorded the method determines whether the magnitude of the global minima are decreasing over time. If the magnitudes are decreasing, the method maintains a current amount of biocide dosed into the fluid system in one or more subsequent dosing.

The above two scenarios deal with the situation of increasing or decreasing magnitudes of global minima M's. Another possible scenario is where the magnitudes of the global minima M's are essentially constant over time. By essentially constant is preferably meant that the magnitudes vary within a span of ±3%, such as ±5%. This could be construed as representing an efficient dosing according to which a sufficient amount of dosing is used to remove all biofilm. However, this may not be the case, since it could easily well represent a situation where overdosing takes place as one cannot determine from the evolution of the global minima M's whether less dosing also would result in that the magnitudes of minima M's would be essentially constant.

Thus, to take this into consideration, preferred embodiments of the method may further comprise recording a number of subsequently identified global minima M's, for each of which an inflection point IP has been identified time wise after, the magnitude of the global minima. When the magnitude are recorded, the method determines whether the magnitude of the global minima are essentially constant over time, and if the magnitudes are essentially constant over time, the method decreases the amount of biocide dosed into the fluid system in one or more subsequent dosing.

Implementation of dosing regulations, (increase, decrease or maintain current dosis) is found to be dependent of the actual layout of the fluid system as well e.g. the contents of nutrients in fluid, oxygen level and/or temperature. In some embodiments, default values are predefined, e.g. if dosing is to be increased, the dosing is increased by 30% and if dosing is to be decreased the dosing is decreased by 10%. By this, empiricism is gradually obtained for the system which can be used to refine the dosing regulations e.g. by scaling the default regulations depending on changes identified in a number of consecutive global minima. In another approach, empirical relations are known a priory, e.g. from similar or identical fluid systems, and such empirical relation can be implemented in a newly set-up system. In another approach, dosing could be controlled by a machine learning algorithm It is noted that a decreased dosing may result in that the magnitudes of the global minima M's increase and if the above disclosed method of handling such increase is implemented, this method will increase the dosing.

The way of determining the increase or decrease in magnitudes of the global minima (M's) can be determined in a number of way. In connection with the present invention it has been found highly efficient to apply a method by which the increase or decrease is determined based on fitting a straight line through the global minima considered. The slope of such a fitted straight line can at least indicate whether the minima are increasing (positive slope) or decreasing (negative slope). However, in an attempt to improve the accuracy in the determination of increase or decrease, the correlation coefficient for the fitted line to the global minima is considered. In preferred embodiment, it is required that the correlation coefficient is larger or lower than a predefined number, such as larger than 0.9 or lower than −0.9 before the slope of this fitted line is used to determine whether the minima are increasing or decreasing.

There are a couple of ways of fitting a linear line to the global minima. The global minima occurs on certain know time instants thus data pairs of magnitude and time are available as:

| $M_1$ | $M_2$ | $M_3$ | $M_n$ |
|-------|-------|-------|-------|
| $t_1$ | $t_2$ | $t_3$ | $t_n$ |

Where "M" represents magnitudes and "t" represents time. While a linear line could be fitted to these data pairs in connection with the present invention, the following fitting has shown be very effective.

Instead of using "t" as a basis for the fitting, the fitted straight line preferably takes as variable, counts of minima (1, 2, 3, . . . n) and the values of the minima. In terms of data pairs this may be visualised as

| $M_1$ | $M_2$ | $M_3$ | $M_n$ |
|-------|-------|-------|-------|
| $n_1$ | $n_2$ | $n_3$ | $n_n$ |

Where "M" represents magnitudes and "n" represents a count number. In FIG. 7, the index in GM is considered to be the count number. Thus, for the data of FIG. 7, the line is fitted to the following data:

| Value of $GM_1$ | Value of $GM_2$ | Value of $GM_3$ |
|-----------------|-----------------|-----------------|
| 1 | 2 | 3 |

It is noted that not all the data pairs available must be used, but once used should preferably be in succession, since a subset e.g. $[M_3;t_3]$ $[M_4;t_4]$ $[M_5;t_5]$ can be used. Further the actual number of data pairs can be varied. However, it is generally preferred that the latest occurring global minimum is included in the data set to which a linear line is fitted.

The raw readout from the biofilm sensor 3 is typically a continuous electrical signal. Such a signal, or a signal in general from a biofilm sensor, is preferably filtered, e.g. to remove noise from the signal. Further, if the signal is a continuous signal, a sampling is preferably used to provide discrete signals. The sampling rate is selected to assure that data is representative for the measurements. When such data processing is carried out, a time stamp is preferably provided to each data so that data pairs containing magnitude and the time the magnitude occurs are logged.

In some practical implementations of the invention it has been found that while filtering may remove noise and/or other overlays on the measurement not necessarily representing the state of the biofilm formation, there may still be fluctuations in the data which render the determination of minimum M and/or inflection point IP difficult. To this, the invention may make use of applying a moving mean algorithm having a predefined window size on the filtered read-outs. In embodiments not including filtering, the moving mean may still be applied according to the invention.

Figure 6:
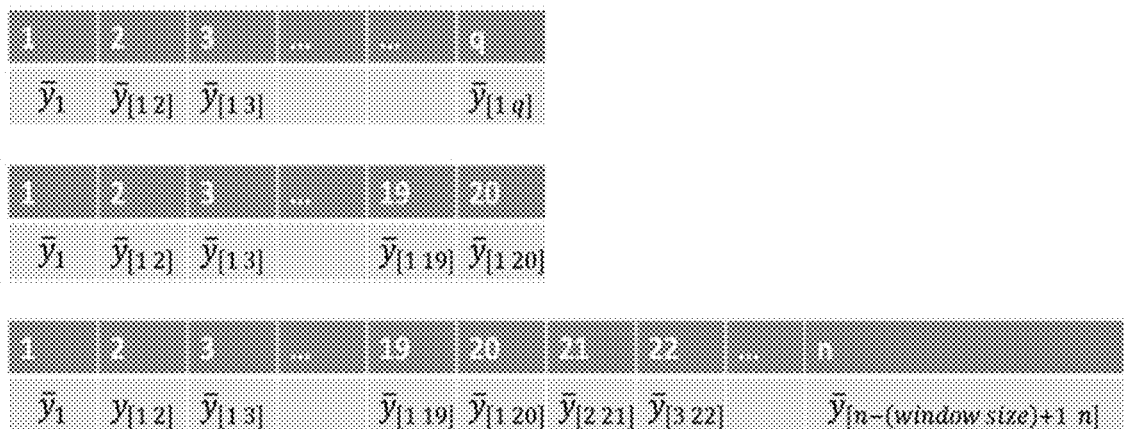
FIG. 6 schematically illustrates a moving mean according to a preferred embodiment of the invention.

An example of a moving mean algorithm used in preferred embodiments of the invention is sketched in FIG. 6. In FIG. 6 three tables are shown labelled with "i", "ii" and "iii" respectively. Each table shown has a counter [1 . . . ] for the consecutive counts of measurements y. In the table the value resulting from applying the moving mean is indicated as $$\tilde{y}_{[ \ldots ]}$$

The data points on which the moving mean is based is shown as subscript "[ . . . ]". As can been seen, when the first data point is available (subscript 1) that very data point is assigned to be representative of the moving mean at the point in time where only this data point is available. When further data points are available the data points available are used in determining the moving mean. In the example shown in FIG. 6, a window size of twenty measurements are used when determining the moving mean, although the invention is not limited to this actual window size. By this, the data points used at a given time (after twenty data points are available) can symbolic be written as:

$$\tilde{y}_{[n-(windsow\ size)+1\ n]}$$

Where "n" in this symbolic writing is the $n^{th}$ data point and "window size" is an integer. In the above example the window size is twenty.

In embodiments where moving mean is applied, the determinations of the minimum M, inflection point IP and other characteristics of the curve of measurement is based on measurement to which such a moving average is applied.

Different approaches to determining a minimum can be used in connection with the present invention. In particular preferred embodiments, a minimum M is identified as a change in slope from smaller than zero to larger than zero (see FIG. 3 and description above) or identified as the slope being equal to zero. Instead of taking the slope as decisive parameter, the angle corresponding to the slope can be evaluated based on the angle corresponding to the slope, typically evaluated as tan(slope), where a change in sign shows the presence of a minimum. Alternative methods to determine a minimum and an IP can be non parametric fitting techniques (e.g. smoothing splines, locally weighted scatter smoothing) and machine learning cycle shape recognition.

As also detailed above and with reference to FIG. 3, an inflection point IP is in preferred embodiment the position where a rate of change in slope or the angle corresponding to the slope is from increasing to decreasing.

Preferred embodiments of the invention are executed in a manner that can be termed on-line mode. By this is preferable meant that the method is essentially carried out synchronized with the occurrence of data, such that a sequence is based on a data set comprising most recent available data. Essentially in this context preferably refers to that delays in data transmission and other delays is in-essential.

However, the invention may also be carried out in what may be called off-line mode. In such an off-line mode, a number of data points are collected before the procedure for identifying minimum M, inflection point IP and other characteristics of the measurements are carried out. This may have the advantage that a spline or other curve fitting can be overlaid the measurements, which potentially may reduce the risk of identifying local and not global minimum M and/or inflection point.

The invention also relates to an hardware implementation of the various embodiments of the method according to the invention. In some preferred embodiments, the hardware implementation relates to a fluid system 1 comprising a biofilm sensor 2 arranged in the fluid system 1. The biofilm sensor 2 is arranged so that its sensing surface 3 is exposed to a fluid in the fluid system (when fluid is present in the system). The biofilm sensor 2 is configured to measure an amount of biofilm on said sensing surface 3 of the biofilm sensor 2. The biofilm sensor is preferably of an electrochemical sensor type readily available for purchase.

A dosing pump 4 is arranged in the fluid system 1 to dose biocide into fluid system. Further, a control unit 5 configured for carrying out embodiments of the method according to invention is equipped and configured to activating the dosing device.

In other embodiments, a preferred embodiment of the method is installed with a dosing pump 4. Such dosing pumps typically has an electronic controller including a memory used inter alia to store measurements data, such as an PLC controller for controlling the operation of the pump. However, since such an electronic controller is software based, preferred embodiments of the invention can be implemented in such a controller by downloading software which when executed carries out method steps according to a preferred embodiment of the invention. The electronic controller typically has an interface which can be used to receive sensor read-outs from the biofilm sensor 2.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED

1 Fluid system
2 Biofilm sensor
3 Sensing surface
4 Dosing pump
5 Control unit
6 Inlet
7 Outlet
M Minimum
IP Inflection Point
Z Reference magnitude
BL Baseline

The invention claimed is:

1. A method of dosing biocide into a fluid system, the method comprising:

providing a control unit, a biofilm sensor arranged in the fluid system and a dosing pump arranged in the fluid system to dose biocide into the fluid system, the biofilm sensor having a sensing surface configured to be exposed to a flow of fluid in the fluid system, the sensor being configured to measure an amount of biofilm on said sensing surface of the biofilm sensor, said control unit being configured to obtain and store data representing measurements of the amount of biofilm on said biofilm sensor from said biofilm sensor, said dosing pump being controlled by said control unit to dose biocide into the fluid system;

controlling said pump by the control unit to provide a dose of biocide into the fluid system;

after said initial dose of biocide, obtaining and storing data from said biofilm sensor via said control unit, said data representing measurements of a first amount of biofilm on said biofilm sensor measured by said biofilm sensor after said initial dose of biocide;

determining a minimum in said data via said control unit, wherein said minimum represents a maximum obtainable biofilm removal from said sensor based on said initial dose of biocide;

determining an inflection point in said data via said control unit, the inflection point occurring after said minimum in said data, and recording the inflection point via said control unit, wherein said inflection point represents a point in time at which measurements of a second amount of biofilm begin to go towards a plateau, wherein said plateau represents that said biofilm sensor is no longer capable measuring biofilm growth on said sensing surface;

determining the point in time based on said data via said control unit to provide a subsequent dosing of biocide into the fluid system via said control unit after said inflection point and said minimum are determined, wherein said point in time is determined to occur after said inflection point and before said plateau in said data is reached; and controlling said pump by the control unit to provide said subsequent dosing into the fluid system via said dosing pump at said point in time.

2. A method according to claim 1, wherein the subsequent dosing of biocide is based on a dosing criteria to be fulfilled comprising a magnitude of measurements in the data asymptotically going towards a constant value.

3. A method according to claim 2, where the subsequent dosing of biocide is provided based on a slope or an angle in the data corresponding to a post-inflection slope in the data after an occurrence of the inflection point and initiating the subsequent dosing of biocide is based on changes in the slope or the angle in the data corresponding to the post-inflection slope.

4. A method according to claim 3, wherein the subsequent dosing of biocide is provided based on the angle corresponding to the slope in the data passing a predefined threshold based on a tangent of the angle being less than 40.

5. A method according to claim 3, wherein the subsequent dosing of biocide is provided based on the angle corresponding to the slope in the data passing a predefined threshold, where the threshold is selected from between a tangent of angles (y, A) greater than 40 and less than 60.

6. A method according to claim 3, wherein the subsequent dosing of biocide is provided when the angle corresponding to the slope passes a predefined threshold, where the threshold is selected from between a tangent of angles (y, A) more than 50 and less than 70 degrees, or more than 70 and less than 90.

7. A method according to claim 2, wherein the subsequent dosing of biocide is provided when a correlation coefficient is greater than a preselected number, the correlation coefficient being determined based on a linear line fitted to at least a subset of the data.

8. A method according to claim 2, wherein the subsequent dosing of biocide is provided based on the magnitude of measurements of the amount of biofilm in the data being above a predefined reference magnitude.

9. A method according to claim 2, wherein an amount of the subsequent dosing of biocide is increased if the magnitude of measurements increase over time, the magnitude of measurements being based on minima in the data after the inflection point is identified.

10. A method according to claim 2, wherein an amount of a further subsequent dosing of biocide is equal to the subsequent dosing of biocide if the magnitude of measurements decrease over time, the magnitude of measurements being based on minima in the data after the inflection point is identified.

11. A method according to claim 2, wherein an amount of a further subsequent dosing of biocide is decreased if the magnitude of measurements are constant over time, the magnitude of measurements being based on minima in the data after the inflection point is identified.

12. A method according to claim 9, wherein an increase or decrease in magnitude of a subsequently identified minima is determined based on fitting a straight line through the subsequently identified minima considered and if the correlation coefficient is greater than predefined number the slope of this fitted line is used to determine whether the subsequently identified minima are decreasing or increasing.

13. A method according to claim 2, wherein the data representing measurements of the amount of biofilm is obtained by filtering read-outs from the sensor and by applying moving mean algorithm having a predefined window size on the filtered read-outs.

14. A method according to claim 2, wherein the minimum is identified as a change in slope from smaller than zero to larger than zero, the slope is zero, or an angle corresponding to the slope, evaluated as tan to slope, changes sign from negative to positive.

15. A method according to claim 2, wherein the inflection point is determined as a rate of change in slope or the inflection point is determined as an angle corresponding to the slope from increasing to decreasing.

16. A method according to claim 2, wherein the method is carried out synchronized with an occurrence of data, such that a sequence is based on a data set comprising most recent available data.

17. A method of dosing biocide into a fluid system, the method comprising:

providing a control unit, a biofilm sensor arranged in the fluid system and a dosing pump arranged in the fluid system to dose biocide into the fluid system, the biofilm sensor having a sensing surface configured to be exposed to a flow of fluid in the fluid system, the sensor being configured to measure an amount of biofilm on said sensing surface of the biofilm sensor, said dosing pump being controlled by said control unit to dose biocide into the fluid system;

controlling said pump by the control unit to provide an initial dose of biocide into the fluid system;

after providing said initial dose of biocide, measuring the amount of biofilm on said biofilm sensor via said biofilm sensor to provide biofilm data;

transmitting said biofilm data to said control unit, said control unit storing said biofilm data;

determining a minimum in said biofilm data via said control unit, wherein said minimum represents a maximum obtainable biofilm removal from said sensor based on said initial dose of biocide;

determining an inflection point in said biofilm data via said control unit, the inflection point occurring after said minimum in said data, and recording the inflection point via said control unit, wherein said inflection point represents a point in time at which said measurements of a second amount of biofilm begin to go towards a plateau, wherein the plateau represents that the biofilm sensor is no longer capable of measuring biofilm growth on the sensing surface;

determining the point in time based on said data via said control unit to provide a subsequent dosing of biocide into the fluid system via said control unit after said inflection point and said minimum are determined, wherein said point in time is determined to occur after said inflection point and before said point in time is reached at which said biofilm sensor is no longer capable of measuring biofilm growth on said sensor surface;

controlling said pump by the control unit to provide said subsequent dosing into the fluid system via said dosing pump at said point in time.

18. A method according to claim 17, wherein the subsequent dosing of biocide is based on a dosing criteria to be fulfilled comprising a magnitude of measurements in the data asymptotically going towards a constant value.

19. A method according to claim 18, where the subsequent dosing of biocide is provided based on a slope or an angle corresponding to a post-inflection slope in the data after an occurrence of the inflection point and initiating the subsequent dosing of biocide is based on changes in a subsequent slope or angle in the data corresponding to the post-inflection slope.

20. A method according to claim 19, wherein the subsequent dosing of biocide is provided based on the angle corresponding to the slope in the data passing a predefined threshold, and wherein a tangent of the angle is less than 40.

* * * * *